Dec. 28, 1965   M. SORKIN ETAL   3,226,713
PRECISION TRACKING SYSTEM
Filed Oct. 31, 1963   6 Sheets-Sheet 1
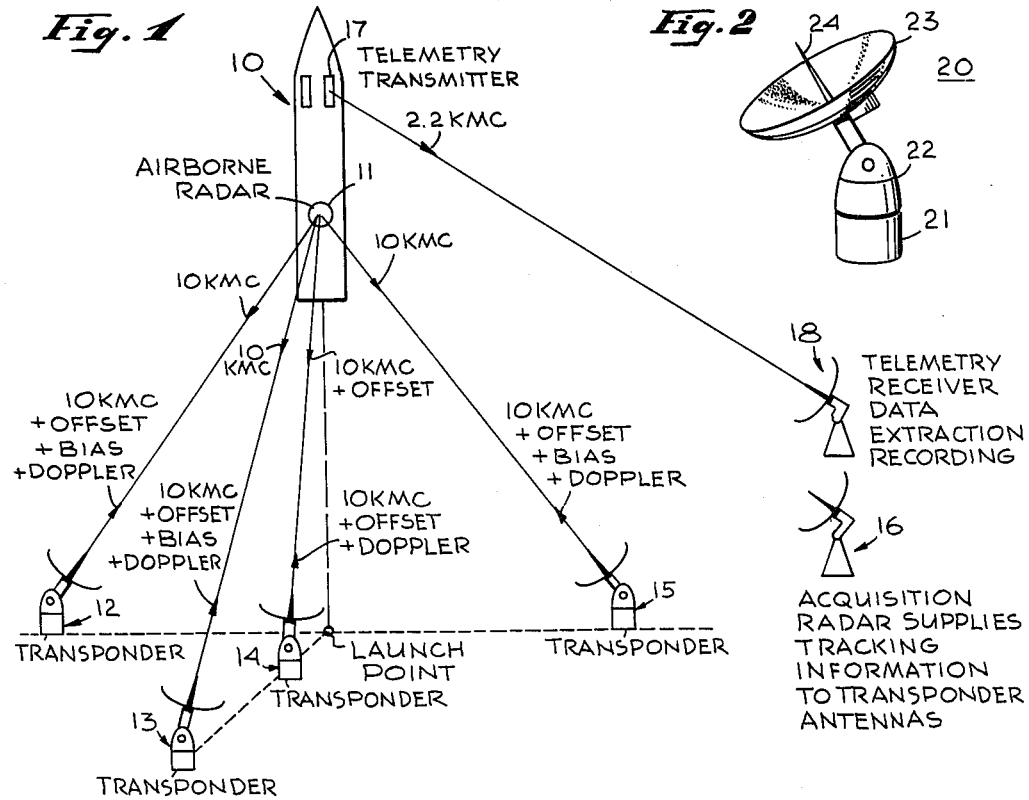
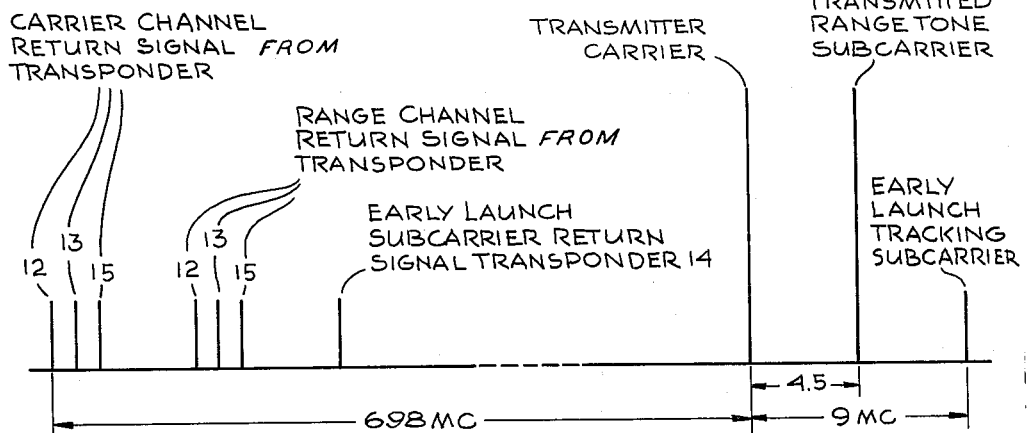
INVENTORS
MORRIS SORKIN
DON M. JACOB
BY
AGENT

INVENTORS
MORRIS SORKIN
DON M. JACOB
BY
AGENT

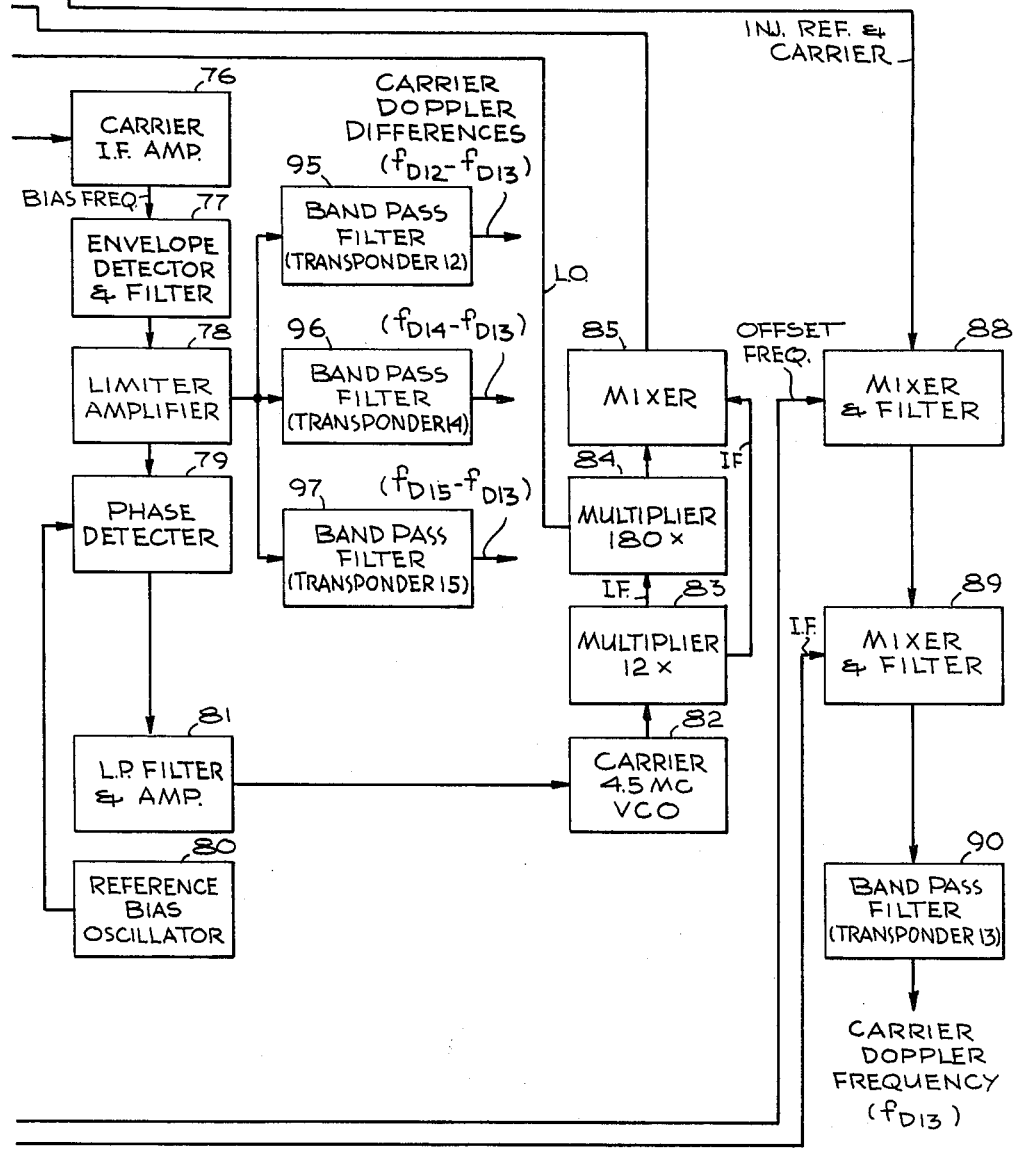

Dec. 28, 1965    M. SORKIN ETAL    3,226,713
PRECISION TRACKING SYSTEM
Filed Oct. 31, 1963    6 Sheets-Sheet 6
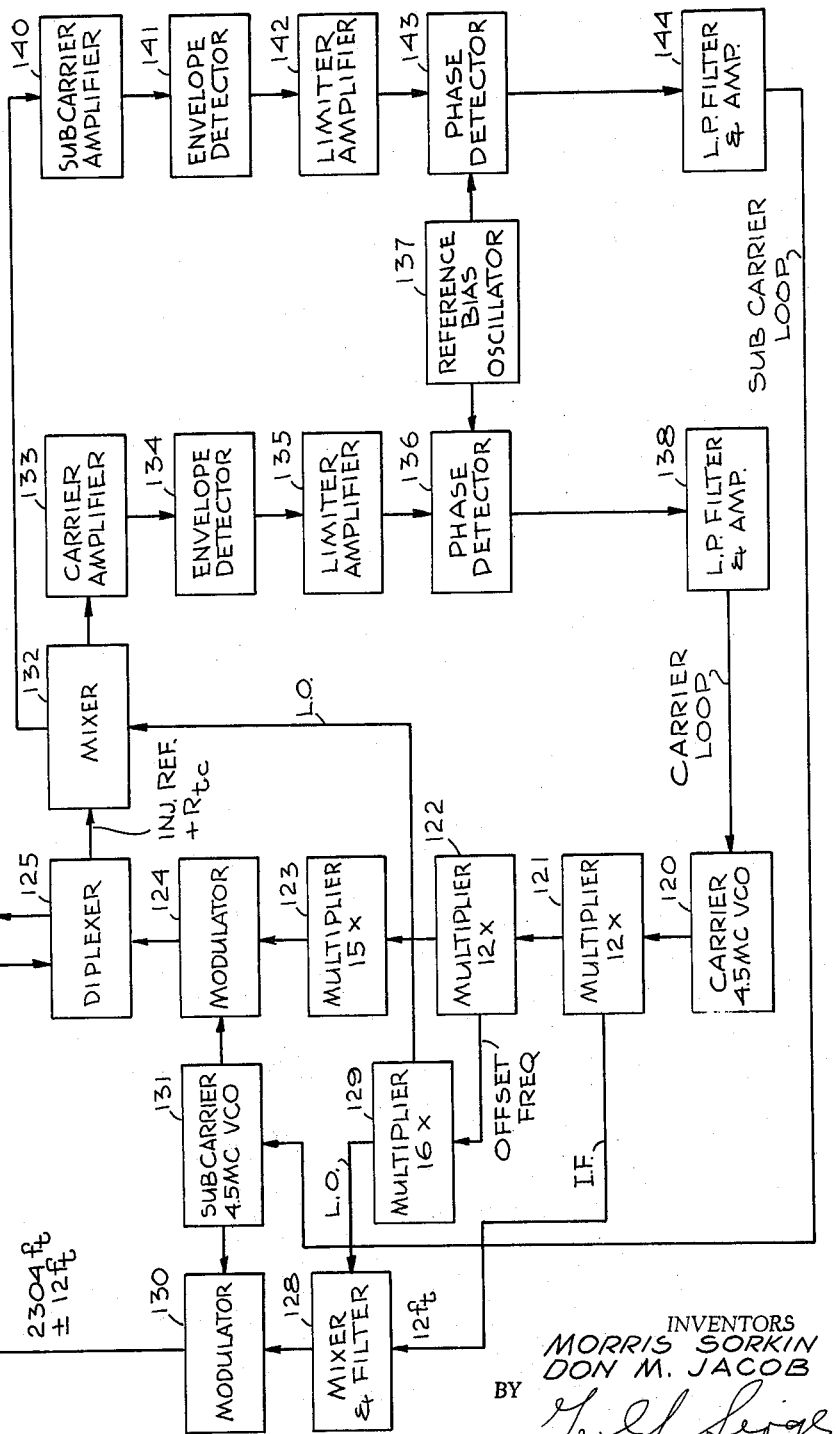
Fig. 9
INVENTORS
MORRIS SORKIN
DON M. JACOB
BY
AGENT

United States Patent Office 3,226,713
Patented Dec. 28, 1965

3,226,713
PRECISION TRACKING SYSTEM
Morris Sorkin, Santa Monica, and Don M. Jacob, Los Angeles, Calif., assignors to TRW Inc., a corporation of Ohio
Filed Oct. 31, 1963, Ser. No. 320,472
12 Claims. (Cl. 343—6.5)

This invention relates to a precision cooperative continuous wave (C.W.) doppler tracking system of the interferometer type in which the master station or radar is in the vehicle being tracked and the individual transponders are located at fixed position on the ground.

In this invention the vehicle being tracked carries a C.W. radar transmitter and receiver. The transmitted C.W. signal is individually received by at least three and possibly four transponders located on the ground in fixed locations with respect to each other. The transponders are each capable of transmitting a carrier signal back to the radar receiver that is phase coherent with the received C.W. signal from the radar transmitter. The radar receiver determines the phase difference between the transmitted C.W. signal and each of the received C.W. signals from the transponders which information is used to determine the range and range rate of the vehicle. By using at least three transponders at fixed locations the position of the vehicle in space can be accurately determined and telemetered to a suitable remote location or used in the vehicle as guidance command signals.

The disclosed system can be contrasted with present day tracking systems that use a ground based radar together with a transponder located in the vehicle and a plurality of remotely located receivers. These prior art systems require a ground link for timing purposes between the radar transmitter and the remote receivers in order to properly extract and use the information. Systems of this type are exemplified by the so-called Mistram system described in Electrical Design News, September 1960. In contrast with the prior art, the disclosed system might best be described as an inverted interferometer.

Certain unobvious advantages with respect to accuracy, reliability and cost accrue in favor of the disclosed inverted interferometer. For example, the elimination of a ground link system, necessary in the prior art systems, reduces the equipment necessary by approximately one half, since the ground link limits the total accuracy of the whole system and by necessity must be phase stable. Reducing the equipment need by so large a factor without affecting the precision of measurement also improves total reliability at a substantially lower cost.

The invention is a unique application and improvement of copending applications Serial No. 237,229, entitled Phase Stable Receiver filed November 31, 1962 by R. E. Graves et al., Serial No. 248,357, entitled Beacon Tracking Radar filed December 31, 1962 by D. M. Jacob, and Serial No. 248,680, entitled Unambiguous Range Radar System filed December 31, 1962 by D. M. Jacob, all assigned to the same common assignee.

The preferred embodiment is described in connection with an X-band radar located on a vehicle to be tracked. The transponders are located at substantially fixed locations bearing a known relationship to each other. Both the radar and the transponders make use of the injected reference technique that is more fully described and claimed in copending application Serial No. 237,229. The injected reference technique has distinct advantages for high ranging accuracy and great system flexibility since the injected reference signal allows a high degree of stability in a phase tracking receiver and circumvents the "zero-set" problem which arises because of drifts in receiver delay time with variations in temperature and signal strength. The basic idea of the injected reference system is to track an incoming signal by injecting, prior to any RF filtering, an RF signal derived from tracking oscillators. The incoming signal consists of a carrier and a ranging sideband that is tracked by injecting an identical signal maintained at a displacement of approximately 30 kc. relative to the incoming signal. A displacement frequency of 30 kc. was used on the 400 mc. receiver described in the copending application Serial No. 237,229. The displacement frequencies used in the X-band radar application Serial No. 248,357 are 32 kc. for the transponder and 38 kc. for the radar. The injected reference and incoming signal are reduced to an intermediate frequency (IF) more suitable for amplification by present day solid-state devices by means of a separate stable local oscillator (STALO) in both the radar and the transponder.

In the conventional case as exemplified by the prior art, the local oscillator frequency is constrained to exceed the signal frequency by the IF frequency. Since the IF phase is compared with the reference oscillator phase in the phase detector, the IF frequency is determined by the reference oscillator frequency, usually 4 to 5 mc. for stability reasons. The phase detector output is a D.C. voltage, used to control a voltage controlled oscillator (VCO). The VCO frequency is multiplied up to the required L.O. frequency which therefore tracks the signal in frequency and phase. However, changes in signal level, variations in components due to environmental changes, aging, etc., cause phase changes which are also phase tracked, introducing a phase error, and therefore, a range error. If the rate of phase change is high enough it will also cause a significant range rate error.

In the case of the injected reference phase locked receiver, the situation is greatly improved since the L.O. frequency is independent of the reference oscillator frequency, and may be chosen on the basis of other considerations. For this system, it is 54 mc., a value which is easily derived from the VCO multiplier chain.

The VCO control signal again comes from the output of the phase detector, which compares the phase of the reference oscillator and the difference between the signal and injected reference frequencies, which appears in the detector output following the IF amplifier. That difference frequency is therefore equal to the reference oscillator frequency which is 32 kc. for one transponder. Other values such as 37 kc. and 43 kc. are used in the other transponders.

Since the signal and injected reference frequencies differ by only 32 to 43 kc., at an IF frequency of 54 mc., any phase changes due to circuitry for the reasons previously mentioned will cause almost equal phase changes of both signals, and therefore, the phase change of the difference frequency is greatly reduced.

The differential phase change has been determined experimentally to be about 1% of the equivalent change in the conventional phase locked receiver. The excellent phase stability is also a result of the effectively constant signal level of the injected reference signal in the IF amplifier.

The ranging information is obtained by phase tracking the subcarrier in substantially the same manner as described and claimed in copending application Serial No. 248,357. The carrier and sideband signals are separated by filtering at the lower intermediate frequencies and individually tracked in separate channels. A detector on the output of each channel IF amplifier detects the frequency offset between the carrier or sideband being tracked and the associated injected reference. Consequently, the channel IF amplifier detector actually serves the purpose of a mixer, and the injected reference serves as local oscillator power in the second mixer. The resulting signal is filtered and applied to a limiter-amplifier which provides most of the receiver gain. The output of the limiter-amplifier is phase detected in both the carrier and subcarrier channels against a common reference oscillator which establishes the frequency offset of the injected reference signal.

The output of the phase detector in the carrier channel is applied to a voltage-controlled oscillator (VCO) through an appropriate compensation network and amplifier. The output of the carrier VCO after frequency multiplication becomes the carrier injected reference. The signal from the phase detector of the sideband channel is used similarly to control a VCO which runs at the ranging modulation frequency. The output of this VCO is used to modulate the injected reference carrier to generate the injected reference sideband.

The phase stable feature of the tracking receiver consists first of establishing the phase information on the displacement frequency of approximately 32 to 43 kc. prior to passage through filters and amplifiers. Secondly, the injected reference signal in the IF amplifiers establishes the operating power level in the IF amplifiers so that the power level in the IF is essentially constant for the dynamic range of incoming signals.

The tranpsonders are a simplified version of the basic radar configuration and perform modulation phase tracking of the received carrier and subcarrier signals. The carrier frequency transmitted by the transponder is offset from the carrier frequency transmitted by the radar to eliminate ambiguities in transmitting and receiving information at the radar receiver.

Further objects and advantages will be made more apparent by referring now to the accompanying drawings wherein:

FIG. 1 is a block diagram illustrating the basic inverted interferometer system;

FIG. 2 illustrates the ground station transponder;

FIG. 3 illustrates the frequency spectrum of the carrier and transponder signals;

FIG. 9 is a more complete block diagram of the transponder.

Figure 4:
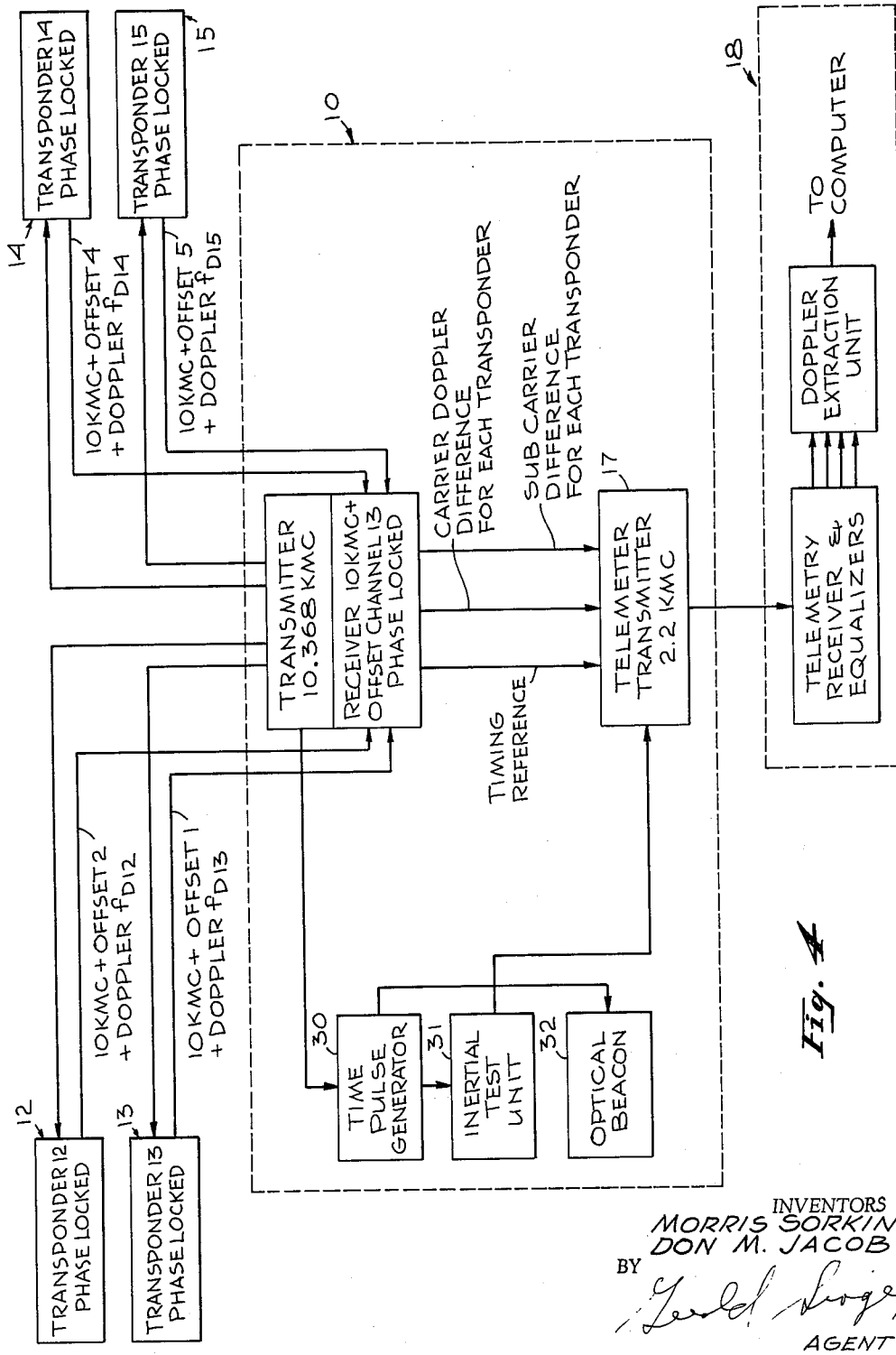
FIG. 4 is a block diagram illustrating the signal paths for the complete system.

The present invention is a precision radio tracking system in which the master station or radar is in the missile and the individual phase coherent transponders are located at a plurality of fixed ground base stations.

The described system is capable of extremely high precision of measurement for the nearly vertical trajectory shown in FIG. 1, for example; range rate to .02 ft./sec.; range rate differences to .002 ft./sec.; range to .2 ft.; and range differences to .014 ft. Fine range data resolution is obtained by measuring the phase of a subcarrier (approximately 4.5 mc.) that is sent to a transponder and coherently transmitted back to the radar. The 4.5 mc. phase stability is achieved by phase stabilization techniques in which the carrier and subcarrier signals are tracked along with an injected reference in two separate narrowband receivers, as described and claimed in copending application Serial No. 237,229. The 4.5 mc. ranging subcarrier is substantially identical to that described and claimed in said copending application and is obtained by modulating, and preferably amplitude modulating, the transmitted signal with a 4.5 mc. modulation signal, recognizing that other modulation techniques could be used. The same 4.5 mc. signal is also used to modulate the injected reference signal which tracks the phase of the incoming signal plus its 4.5 mc. subcarrier. The present invention described and claims improved range and angle tracking techniques resulting from the use of an injected reference signal in the inverted interferometer system. The improved tracking is achieved by employing the novel inverted interferometer principle which essentially keeps track of the phase variation of the incoming signals received from at least three transponders located on the ground. The phase difference in the received carrier signals from the three transponders provides the necessary angle tracking information, whereas the phase difference between the carrier and subcarrier signal provides range information. The radar receiver handles multiple transponder return signals without a multiple receiver, by phase tracking one transponder return only, and extracting the doppler differences of the other transponder return signals.

Referring now to FIG. 1, there is shown a vehicle 10 arranged to carry an airborne radar 11 comprising a radar transmitter and a radar receiver. In the preferred embodiment an X-band frequency of approximately 10 kmc. is used in order to obtain the claimed system accuracy. A plurality of ground based transponder stations 12, 13, 14 and 15 are used. Due to the need for a large tracking range the transponders are attached to highly directive dish antennae that are remotely controlled and aimed at the vehicle 10 by means of a remotely controlled and operated tracking radar 16. For those situations in which the informtaion is used for tracking purposes, a suitably located telemetering transmitter 17 having a frequency of substantially 2.2 kmc. is arranged to telemeter the information to a ground receiving station 18.

The system measures slant range R, and slant range rate $\dot{R}$ of the vehicle 10 with respect to each ground transponder 12, 13, 14 and 15. These measurements, in the form of doppler frequencies and doppler difference frequencies of the carrier and subcarrier, are transmitted to the ground via the 2.2 kmc. telemetry transmitter 17, where the information is extracted and converted to digital form for use in a computer. The computer converts the data to metric position $x$, $y$, $z$ and rate $\dot{x}$, $\dot{y}$, $\dot{z}$, with origin at the launch point in which $x$ and $y$ are orthogonal directions in the horizontal plane and $z$ is vertical.

Transponders 12, 13 and 15 represent the interferometer and are placed about 100,000 feet from the launch point in an L configuration, with baselines of 70,000 to 100,000 feet. Transponder 14 is placed very close to the launch point in order to improve the accuracy of the $z$ and $\dot{z}$ measurement, for the case of the launch of a vehicle with a nearly vertical trajectory. Because of the nearly vertical trajectory and the long baselines needed for in-flight tracking accuracy, the accuracy of the $\dot{z}$ measurement from the outlying transponders 12, 13 and 15 is poor from launch to an altitude of about 100,000 feet, which is the distance of the transponders 12, 13 and 15 from the launch point. By placing transponder 14 as close as practical to the launch point, perhaps 200 feet, the $\dot{z}$ accuracy will be as good as the $\dot{x}$ and $\dot{y}$ accuracy above an altitude of 400 feet.

The radar in the vehicle 11 transmits a carrier signal to transponders 12, 13 and 15 on the ground, from a broad beam antenna. The actual carrier frequency is a function of the multiplier chain and the reference oscillator frequency. In the preferred embodiment a reference oscillator frequency of 4.5 mc. is used with a multiplier chain of X-2304 which results in a carrier frequency of 10.368 kmc. Another signal, at 10.368 kmc. plus an offset frequency of 9 mc., is transmitted from a separate boom mounted antenna on the vehicle 10 to transponder 14, located very close to the launch point. Each transponder returns a signal, at 180/193 of the combined received frequency (radar transmitted frequency plus doppler frequency shift) plus an individual low bias frequency. The bias frequencies of the transponders are produced by stable oscillators with frequencies of 32 kc., 37 kc. and 43 kc. The spacing between bias frequencies is necessary to allow separation of the doppler frequencies in the vehicle borne radar receiver. The return signal from transponder 14 has the offset (180/193 of 9 mc.) plus a 30 kc. bias frequency. In addition to range rate, range is measured by using a subcarrier as described and claimed in the copending patent application.

Referring now to FIG. 2 there is shown ground station tracking antenna 20 comprising a pedestal portion 21 fixedly attached into the ground and a rotatably supported upper portion 22 arranged to be supported and rotate on the pedestal. Mounted on the upper portion 22 is a highly directive dish reflector 23 and a centrally supported antenna 24. The dish reflector 23 is capable of being elevated in azimuth from a point on the horizon to a vertical position thereby allowing the tracking antenna 20 to follow the vehicle from launch to any line of sight position. In the preferred system an acquisition radar such as FPS-16 radar may be used for orienting the transponder antenna 24. The FPS-16 radar is the military designation for a radar system commercially manufactured by RCA Corporation which is a monopulse tracking and acquisition radar operating in the C band and which uses a gimbel and high gain antenna system as shown in FIGURE 2 for measuring azimuth and elevation angles as well as range. The dish 23 is approximately 6 feet in diameter and the transponder is attached to the underside of the dish 24 as shown in order to minimize the microwave plumbing. FIG. 2 also shows the approximate scales of the transponder package compared to the dish reflector 23.

Referring now to FIG. 3 there is shown a frequency spectrum illustrating the radar and transponder signals used in the system. The airborne radar transmits the same carrier and subcarrier signals to each transponder and receives a carrier and subcarrier return signal from each transponder. All of the return signals are fed to a single radar receiver, which phase tracks only one return signal, for example, the carrier frequency return from transponder 13. The action of the phase locked loop generates a constant difference frequency at a constant amplitude, between the phase tracked return signal and its output signal, also known as the injected reference signal. The vehicle 10 transmits a carrier frequency of 10.368 k.m.c., a range tone subcarrier, displaced 4.5 mc., and the early launch tracking sub-carrier, displaced 9 mc., for transponder 14. The return signals from the transponders are offset approximately 648 mc. due to a multiplying chain of 2304 in the radar transmitter and 2160 in the transponder. The exact ratio is a function of frequency separation desired and multipliers available. The radar transmitted frequency also differs from the transponder frequency by the individual bias frequencies. For example, transponder 12 may have a bias frequency of 32 kc.; transponder 13 a bias frequency of 37 kc.; and transponder 15 a bias frequency of 43 kc. The carrier channel and early launch sub-carrier return from transponder 14 carry the range rate information, and the differences between the carrier channel returns and the range sub-carrier returns carry the range information. The range tone subcarrier is produced preferably by amplitude modulation of the carrier with a 4.5 mc. square wave. This frequency is doubled and also used for suppressed carrier amplitude modulation of a portion of the carrier output feeding the separate antenna directed to transponder 14. The output at the carrier frequency of the early launch subcarrier antenna is at least 26 db below the main carrier output, thereby minimizing possible multipath error at the outlying ground antennae.

Referring now to FIG. 4, there is shown a block diagram illustrating the signal paths for the complete system. The radar receiver while receiving multiple signals from all transponders is arranged to phase track one signal only (transponder 13) and extract its doppler frequency. It is then necessary to only extract the doppler differences of the other received signals with respect to the phase tracked signal.

The frequency difference for both the carrier and subcarrier signals between the transmitter frequency and the injected reference frequency for transponder 13 is extracted and sent to the telemetry transmitter 17 in the vehicle. This frequency is the doppler frequency of the transmitter with respect to transponder 13 plus a known bias frequency. The other return signals from transponders 13, 14, and 15 are carried through the receiver as a conventional receiver. However, instead of extracting the doppler frequencies directly, the difference doppler frequencies with respect to transponder 13 are extracted. These differences have a greatly reduced frequency shift, allowing the use of simple band pass filters to improve the signal noise ratio before feeding the telemetry transmitter 17. Since the bias frequencies are known, the range signals are handled in a similar fashion, resulting in four more signals fed to the telemetry transmitter 17. In addition, a timing reference signal is used to control the radar transmitter 11, to operate a timing pulse generator 30 for producing timing pulses for an inertial test unit 31 and optical beacons 32 in the vehicle 10, and is also telemetered to insure that all instruments in the system have the same timing reference.

The ground data extraction equipment includes phase tracking loops for all signals in order to extract the information without significant phase errors. The bandwidth of each loop is determined by the dynamic range of the vehicle being tracked and may, for example, include a dopple bandwith of 500 cps. and doppler difference signal bandwiths of 50 cps.

Figure 5:
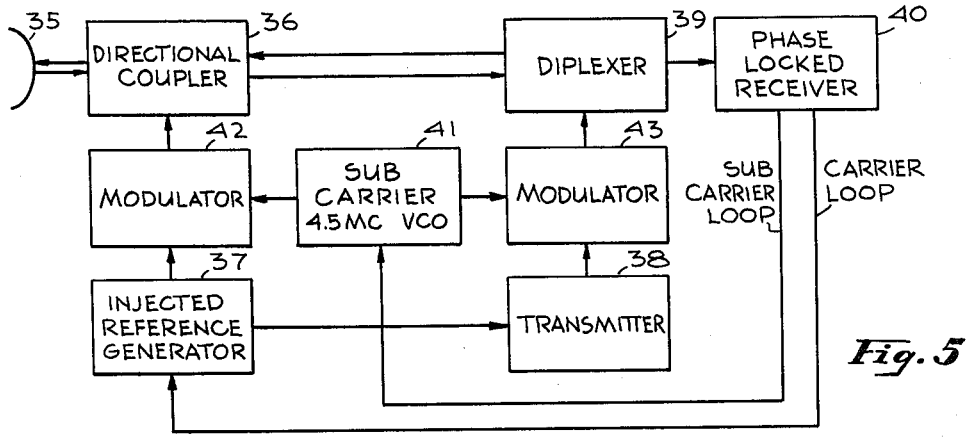
FIG. 5 is a block diagram for the transponder.

Referring now to FIG. 5, there is a block diagram of one of the ground transponders, for example transponder 13. All transponders are identical in construction but differ only in the selected frequency of the bias. In the transponder, the transmitted frequency is derived from the injected reference frequency multiplier chain which establishes a frequency ratio of 180 to 193, between the transmitted and received signal frequencies in order to obtain the desired offset frequency of approximately 698 mc. The transponder receives the radar carrier and subcarrier signal from the vehicle 10 and coherently transmits a carrier and subcarrier having the same phase relationship as received. In this manner the only unknown quantity in the signal received by the radar receiver will be the doppler frequency. Both the radar carrier and subcarrier signals are received by antenna 35, which feeds a directional coupler 36. In the transponder, the injected reference signal is lower than the received signals by an amount equal to the bias frequency. The injected reference signal is generated by an injected reference generator 37 that feeds both the directional coupler 36 and a transmitter multiplier chain 38. The generator 37 is actually a 4.5 mc. VCO that is phase locked to the received carrier signal. The transmitted signal is suitably multiplied to X-band in a transmitter 38 which is coupled to the antenna 35 through a diplexer 39. A phase locked receiver 40 receives the incoming radar signal and the injected reference signal through the diplexer 39. The loop is closed by having the receiver 40 control the frequency of the generator 37 which thereby controls the injected reference signal and the transmitted signal. The receiver X-band signal from antenna 35 is fed into the receiver 40 together with the tracking injected reference signal produced by generator 37 which is below the carrier frequency by the bias frequency. The subcarrier signal which is 4.5 mc. higher than the carrier signal is also phase locked by the receiver 40 which controls a subcarrier 4.5 mc. VCO 41. The subcarrier injected reference signal is produced by the VCO 41 modulating the carrier injected reference signal in a modulator 42. Phase coherency between the received and transmitted signal is obtained by having the same VCO 41 modulating the transmitted signal in a modulator 43. The receiver 40 is therefore phase locked to both the carrier and subcarrier signals.

Figure 6:
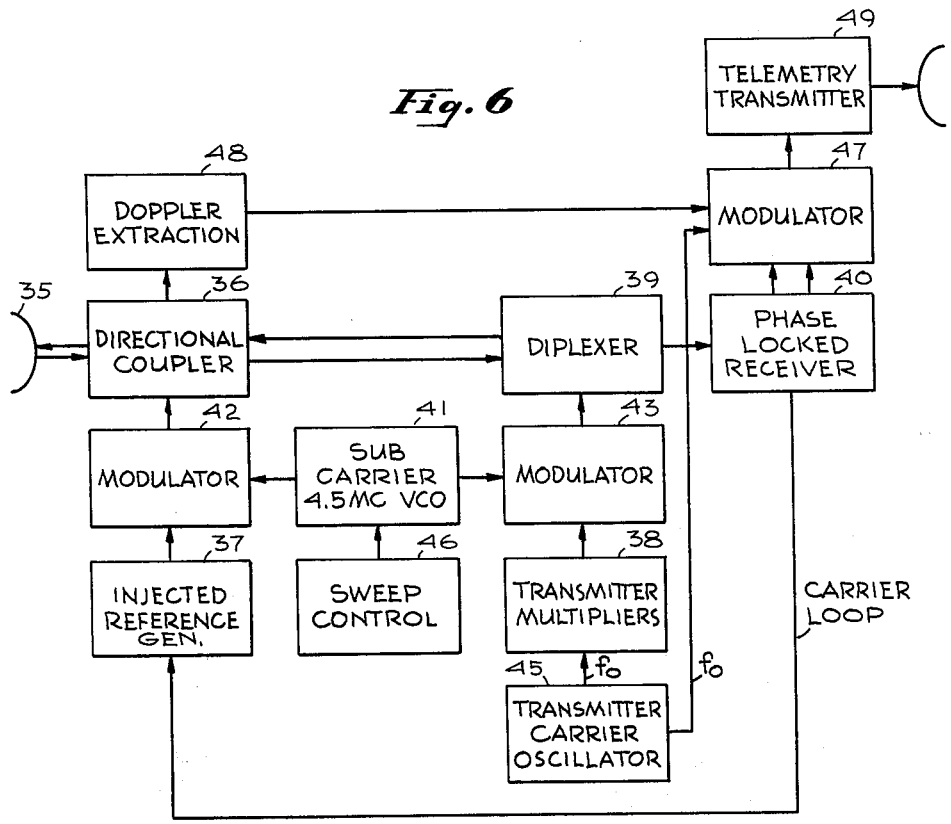
FIG. 6 is a block diagram for the airborne radar.

Referring now to FIG. 6, there is shown a block diagram for the airborne radar which is basically similar to the transponder block diagram of FIG. 5 and hence similar blocks carry identical numbers. The basic receiver phase lock loop is the same with the receiver 40 controlling the generator 37 to thereby insure that the injected reference signal is always offset from the received signal by the bias frequency. Since the radar transmitter generates the subcarrier and carrier signals, a separate transmitter generator oscillator 45 is used to supply the basic transmitted carrier signal. The output from the oscillator 45 controls the transmitter mulitplier 38 which multiplies the signal to the desired carrier frequency for transmission as explained in connection with the ground transponder.

The subcarrier VCO 41 modulates the carrier and injected reference signals in a similar manner as subcarrier described for the transponder with the exception that the VCO 41 is not phase locked but rather is controlled by a sweep control 46 for ranging purposes. The oscillator 45 also supplies a timing signal to a modulator 43 used in connection with the telemetered information. The information from the receiver 40 is contained in the injected reference signal and the transmitted radar carrier signal which is coupled from the directional coupler 36 into a doppler extraction circuit 48. In practice these signals are obtained from the arm of the directional coupler 36 that is normally terminated in a fixed impedance. The arrows feeding the extraction circuit 48 indicate that both a portion of the transmitted signal and the injected reference signal which is tracking the received signal are fed to the extraction circuit. The modulator 43 receives the output of both the doppler extraction circuit 48 and the transmitter oscillator 45 for modulating a telemetry transmitter 49 for transmission to a ground station.

Figure 7:
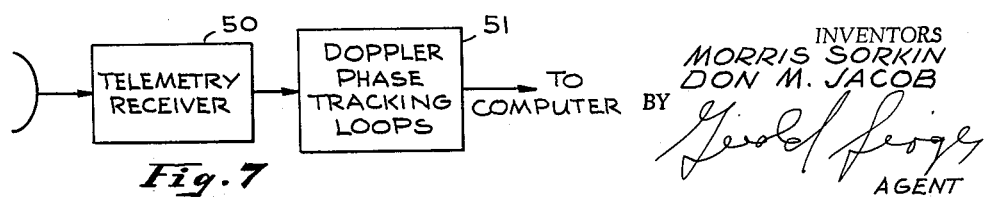
FIG. 7 is a block diagram of the telemetry receiver.

Referring now to FIG. 7, there is shown a telemetry receiver 50 arranged to receive the doppler information modulated on the telemetry carrier signal. The doppler information on the telemetry carrier is extracted by suitable doppler phase tracking loops 51, the output of which may be fed to a computer for processing.

Figure 8A:
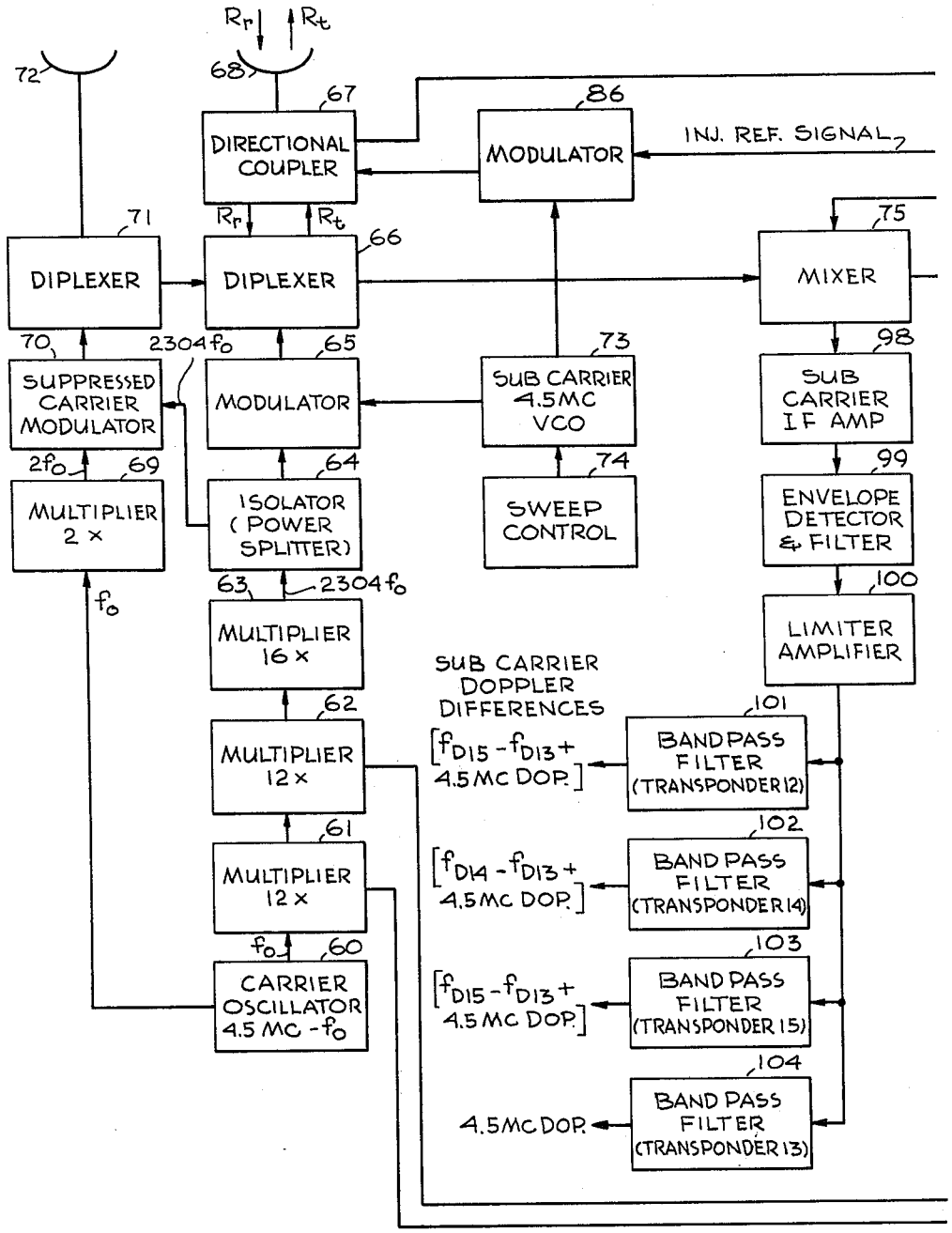
FIG. 8 is a more complete block diagram of the radar transmitter and receiver.

Referring now to FIG. 8, there is shown a block diagram of the radar 11 contained in the moving vehicle 10. The transmitted signal is obtained from a reference oscillator 60 generating a basic signal at approximately 4.5 mc. and identified as $f_0$. This frequency $f_0$ is chosen for convenience only and represents an optimum selection based on oscillator stability and multiplier chains available for multiplying the oscillator frequency to the desired carrier signal. For an oscillator frequency of 4.5 mc. a transmitter multiplier chain having a factor of 2304 will generate a carrier signal of 10.368 kmc. This multiplication is achieved in steps by first having the oscillator 60 feed a 12X multiplier 61, a 12X multiplier 62 and a 16X multiplier 63, the output of which represents the carrier frequency of 2304 $f_0$, which feeds an isolator 64. The carrier frequency from the isolator 64 is fed through a modulator 65, a diplexer 66, a directional coupler 96 and out antenna 68, which radiates the transmitted radar carrier signal to all of the transponders. In the preferred embodiment, solid state multiplier chains are used to obtain a radiant power output of 30 mw. The early launched suppressed carrier modulated with a 9 mc. signal is obtained by feeding the output of the oscillator 60 to a 2X multiplier 69, the output of which is a 9.0 mc. signal ($2f_0$) for modulating the carrier frequency of 2304 $f_0$ received from isolator 64 in suppressed carrier modulator 70. The 9 mc. subcarrier riding on the suppressed carrier is transmitted through a diplexer 71 to a separate antenna 72 for transmission to transponder 14 as illustrated in FIG. 1. The carrier signal is modulated by a subcarrier 4.5 mc. VCO 73 in the modulator 65 for producing the ranging subcarrier. The VCO 73 is controlled by a suitable sweep control 74 for obtaining ranging information. The carrier signal in the preferred embodiment is an X-band signal which is approximately 10,000 mc. that is modulated by a 4.5 mc. signal for producing a sideband having a frequency of the X-band plus 4.5 mc. The ranging information is obtained from the 4.5 mc. subcarrier signal and, hence, is capable of producing unambiguous range for only one wavelength of the 4.5 mc. signal which is approximately 110 feet.

The four transponder return signals are received by the antenna 68 and antenna 72 and are fed through the directional coupler 67 and diplexers 66 and 71 to a mixer 75 which represents the receiver input. The injected reference signals which track the received signal are also fed into the directional coupler 67, through diplexer 66 into the mixer 75 where the received signal and injected reference signals are translated to the IF frequency, which in this example, was chosen to be 12×4.5 mc. or 54 mc. The mixer 75 actually subtracts the local oscillator frequency from all the signals feeding the mixer. The output frequencies from the mixer 75 will include a carrier signal, a carrier injected reference signal and a displaced 4.5 mc. subcarrier signal with a corresponding subcarrier injected reference signal, all translated to the intermediate frequency. The carrier signals are amplified by a carrier IF amplifier 76 which feeds an envelope detector and filter 77. The envelope detected signal contains the desired phase information at a reference bias frequency which is fed to a limiter amplifier 78 and then into a phase detector 79 which generates an output signal in response to the phase difference between the detected signal from limited amplifier 78 and a reference bias oscillator 80. The output of the phase detector 79 feeds a low pass filter and amplifier 81 which generates a D.C. voltage for controlling a voltage controlled oscillator (VCO) 82 operating at substantially 4.5 mc. The VCO frequency is fed to a 12X multiplier 83, the output of which feeds a 180X multiplier 84. The output of the multiplier 84 is 2160 times the VCO signal and represents the local oscillator signal which is fed to the mixer 75 for producing the output IF frequency of 54 mc. The output of multiplier 84 also feeds a mixer 85 which also receives a 12X output or 54 mc. from the multiplier 83. The output of the mixer 85 therefore comprises the 2160×4.5 m.c. local oscillator signal and the 54 mc. or IF signal which together represent the injected reference signal that is fed to the directional coupler 67 through a modulator 86. The carrier injected reference signal is modulated by the modulator 86 in order to produce the subcarrier injected reference signal. The incoming received signal from antenna 68 is the transmitted transponder signal which is offset approximately 698 mc. from the radar transmitted signal. As previously explained, this frequency offset is used to remove the possibility of interference between the radar signals and the transponder received signal. Expressed another way, and using the $f_0$ frequency (4.5 mc.) of the transmitter oscillator 90 as a basis, we can show that the radar transmitted frequency is 2304 $f_0$ and that each transponder transmitted frequency is 2148 $f_0$ or 180/193 of the transmitted frequency plus the bias frequency and the doppler shift due to the movement of the vehicle. Expressed mathematically we can show the radar received frequency to be:

$$R_r = \frac{180}{193} 2304 \left(1 - \frac{R}{C}\right)^2 f_0 + \left(1 - \frac{R}{C}\right) f_{\text{bias}}$$

where $$\left(1 - \frac{R}{C}\right)$$

represents the doppler component frequency and $f_{\text{bias}}$ is the bias frequency of the transponder.

The received signals of 2160 $f_0$ are algebraically combined on the directional coupler 67 with the injected reference signals from the output of the mixer 85. The frequency of the VCO 82 is not exactly 4.5 mc. since it is offset from the received signal an amount to the frequency of the reference bias oscillator 80. The radar received signal is offset by 180/193 from the radar transmitted signal and contains doppler information for the round trip from the vehicle to the transponder and back. The received signal contains the transponder bias frequency affected by one way doppler from transponder to vehicle. It can be appreciated therefore, that the frequencies received by the mixer 75 from the diplexer 66 include the radar received signal of $R_r$ and the injected reference signal which is tracking the $R_r$ signal. The mixer 75 also receives the output of the 180X multiplier 84 which signal is similar to the injected reference signal but lower in frequency by an amount equal to 12X which is the IF frequency.

The advantage of having all transponders at substantially the same frequency allows the radar receiver to detect the individual doppler signals by tracking only one of the received signals, which in this example is the signal received from transponder 13. This technique is to be compared with the need for three separate tracking receivers as shown in copending application Serial No. 248,357. The doppler information is extracted in a manner similar to that described and claimed in copending application Serial No. 248,680. By comparing the received carrier signal with the transmitted carrier signal, the doppler information is extracted by feeding an output from the directional coupler 67 which contains the injected reference signal and a 144X $f_0$ signal from multiplier 62 to a mixer 88. The output of mixer 88 is further reduced in a mixer and filter 89 which also receives a 12X $f_0$ or IF signal from the 12X multiplier 61. The output of mixer 89 after being filtered in a band pass filter 90 is the doppler frequency for transponder 13 identified as $f_{D13}$. The doppler frequency is actually produced on a bias frequency of .808 $f_0$ which represents the difference between the radar and transponder offset reference frequencies. The doppler frequency actually appears on a fixed bias frequency of .808 $f_0$ as compared to the 8 k.c. bias frequency described in application Serial No. 248,680. A review of the 156 $f_0$ signal derived from the transmitter multiplier chain will show the 156 $f_0$ is not exactly equal to $\frac{1}{16}$ of the transmitted frequency, but rather, is equal to $193/2304$ of the transmitted frequency and hence the difference between the transmitted offset and the detected offset is .808 $f_0$, which is conveniently used for obtaining sense information of the varying doppler signal.

The carrier doppler difference output signals of the transponders are detected from the limiter amplifier 78 in terms of doppler differences compared to the doppler signal detected in the phase locked loop for transponder 13. For example, the doppler difference for transponder 12 obtained from a band pass filter 95, is a signal equal to the difference in the doppler between transponder 12 and 13 on a suitable bias frequency. In a similar fashion the doppler information from transponder 14 is obtained from a band pass filter 96 as a signal representing the doppler difference between transponder 14 and transponder 13 on a suitable bias frequency. The doppler information from the band pass filters 90, 95, 96, and 97 are each obtained with separate biases of approximately .808 $f_0$ or 3.6 mc. The combined signal is used to modulate the telemetry transmitter 61 illustrated in FIG. 6.

The subcarrier IF signal and subcarrier injected signal are fed from the mixer 75 to a subcarrier IF amplifier 98. Since the carrier frequency is 4.5 mc. displaced from the subcarrier frequency, it is a simple matter in both the carrier IF amplifier 76 and the subcarrier IF amplifier 98 to effectively reject the unwanted signals by limiting the bandwidth in each amplifier to substantially 1 mc. The amplified subcarrier and injected signal is fed to an envelope detector and filter 99 which in turn feeds a limiter amplifier 100. The ranging subcarrier loop described is essentially similar to the carrier loop previously described with the exception that the output of the limiter amplifier 100 is not phase detected in the radar but rather is fed to a plurality of band pass filters 101, 102, 103, and 104, one for each transponder in order to obtain the subcarrier doppler differences. The individual subcarrier doppler differences are telemetered to the ground station together with a time reference from the reference bias oscillator 80. In this manner, the individual subcarrier doppler differences are compared on the ground with the output of the reference oscillator 80 in order to thereby produce the individual range and range rate output for each individual transponder.

Referring now to FIG. 9, there is shown a block diagram of the phase coherent transponder illustrating the range rate (carrier) channel and range (subcarrier) channel. The transmitter portion of the transponder comprises a 4.5 mc. VCO 120 which is multiplied by a 12X multiplier 121, by a 12X multiplier 122, and by a 15X multiplier 123 which produces the transponder carrier frequency that is 2160 times the VCO frequency. The transponder carrier frequency is fed through a modulator 124 to a diplexer 125 which feeds a directional coupler 126 that is connected to the radiating antenna 127. The injected reference signal is produced in a similar fashion as described for FIG. 8, in that the output of multiplier 121, which is the IF frequency, is fed to a mixer and filter 128. The output of multiplier 122 is fed to a 16X multiplier 129 which generates the local oscillator frequency that is mixed with the IF frequency from multiplier 121 in the mixer 128. The output of mixer 128 is fed to a modulator 130 controlled by a subcarrier 4.5 mc. VCO 131. The output from the modulator 130 contains the carrier injected reference signal which tracks the radar received carrier signal and the subcarrier injected reference signal which tracks the received subcarrier signal. The signal received by antenna 127 from the radar transmitter is at a frequency of 2304 $f_0$ plus doppler expressed mathematically as $$2304\left(1-\frac{R}{C}\right)f_0$$

The received signal and the injected reference signal expressed mathematically as $$2304\left(1-\frac{R}{C}\right)f_0+f_{bias}$$

are fed through the directional coupler 126 to the diplexer 125 and to a mixer 132 which also receives the local oscillator input from the multiplier 129. It can be appreciated therefore that mixing the received signal with the local oscillator signal and mixing the tracking injected reference signal with the L.O. signal will produce the received signal to the IF frequency. The carrier IF signals are amplified in amplifier 133 and envelope detected in an envelope detector 134 and fed to limiter amplifier 135. A phase detector 136 compares the phase of the signal from the limiter amplifier 135 against the signal from a reference bias oscillator 137 and generates a signal representative of the phase difference between these two signals to a low pass filter and amplifier 138 which controls the frequency of the carrier 4.5 mc. VCO 120. A review of the carrier loop circuit will show that the VCO controlled signal is controlled by the output of the phase detector 136 which compares the phase of the reference oscillator 137 and the difference between the received signal from the radar transmitter and the injected reference signal which appears in the output of the envelope detector 131. The difference frequency is equal to the frequency of the reference bias oscillator 137 which was arbitrarily chosen to be 32 k.c. for transponder 12. The carrier phase loop just described is therefore locked to the bias oscillator frequency of 32 k.c. Other values such as 37 k.c. and 43 k.c. may be used in the other transponders to maintain separation in bias frequencies between transponders. Since the signal and injected reference frequencies differ by only 32–43 k.c. at an IF frequency of 54 mc. any phase changes due to circuitry will cause substantially equal phase changes in both signals and therefore the phase change of the difference frequency is greatly reduced. This feature is inherent in the injected reference technique and is used in the radar receiver and all transponders.

This description of the carrier loop illustrated only the range rate circuits for obtaining the time rate of change of distance. Range information is obtained from the mixer 132 output which includes the IF subcarrier signal and the IF subcarrier injected reference signal fed to a subcarrier amplifier 140. The amplified signals are fed to an envelope detector 141 and then to a limiter amplifier 142. The signal from the amplifier 142 is compared in phase with the oscillator 137 in a phase detector 143 for controlling the subcarrier VCO 141 through a LP filter and amplifier 144. Since the same 4.5 mc. oscillator 131 locked to the received subcarrier signal is arranged to modulate the transmitted carrier for generating the subcarrier it can be appreciated that phase coherency between the received and transmitted signals is maintained.

This completes the description of the embodiment of the invention illustrated herein. However, many modifications and advantages thereof will be apparent to persons skilled in the art without departing from the spirit and scope of this invention. Accordingly, it is desired that this invention not be limited to the particular details of the embodiment disclosed herein, except as defined by the appended claims.

The embodiments of the invention in which an exclusive property or privilege is claimed are defined as follows:

1. A cooperative tracking system comprising
   means for radiating a continuous wave (C.W.) signal from a moving vehicle,
   at least three cooperative transponders located at fixed remote positions for receiving said C.W. signal,
   each of said transponders transmitting a C.W. signal to said vehicle that is phase coherent with said received signal, and
   means in said vehicle for receiving each of said received transponder signals and comparing the phase of said received signals with said transmitted signal thereby extracting the doppler phase shift in each of said received signals.

2. A cooperative tracking system comprising
   means for radiating a continuous wave (C.W.) signal from a moving vehicle,
   at least three cooperative transponders located at fixed remote positions for receiving said C.W. signal,
   each of said transponders transmitting a C.W. signal to said vehicle that is phase coherent with the received signal, and
   means in said vehicle for receiving each of said transponder signal and phase comparing means for comparing the phase of said received signals with said transmitted signal thereby extracting the doppler phase shift due to the movement of said vehicle.

3. A cooperative tracking system comprising
   means for radiating a continuous wave (C.W.) signal from a moving vehicle,
   at least three cooperative transponders located at fixed remote positions for receiving said C.W. signal,
   a single transponder located substantially close to the launch position of said vehicle,
   each of said transponders transmitting a signal to said vehicle that is phase coherent with the received signal,
   means in said vehicle for receiving each of said transponder signals, and
   means for comparing the phase of said received signals with said transmitted signal thereby extracting the doppler phase shift in each of said received signals due to the movement of said vehicle,
   said single transponder providing more accurate doppler information during the initial launch of said vehicle.

4. A cooperative tracking system comprising
   means for radiating a continuous wave (C.W.) radar signal from a moving vehicle,
   at least three cooperative transponders located at fixed remote positions for receiving said C.W. signal,
   each of said transponders transmitting a signal to said vehicle that is phase coherent with the received signal,
   means in said vehicle for receiving each of said transponder signals,
   means for comparing the phase of said received signals with said transmitted signal thereby extracting the doppler phase shift in each of said received signals due to the movement of said vehicle, and
   means for telemetering said doppler information to a ground station.

5. A cooperative tracking system comprising
   means for radiating a continuous wave (C.W.) signal from a moving vehicle,
   at least three cooperative transponders located at fixed remote positions for receiving said C.W. signal,
   each of said transponders transmitting a C.W. signal to said vehicle that is phase coherent with said received signal,
   means in said vehicle for receiving each of said received transponder signals,
   means for comparing the phase of one of said received signals with said transmitted signal thereby extracting the doppler phase shift in said received signal, and
   means for determining the doppler difference phase shift in said other received signals relative to said detected doppler phase shift whereby the doppler phase shift in all of said received signal is determinable.

6. A cooperative tracking system comprising
   means for radiating a continuous wave (C.W.) signal from a moving vehicle,
   at least three cooperative transponders located at fixed remote positions for receiving said C.W. signal,
   each of said transponders transmitting a C.W. signal to said vehicle that is phase coherent with said received signal,
   means in said vehicle for receiving each of said received transponder signals,
   phase locked loop means for generating an injected reference signal of substantially high constant amplitude and displaced in frequency from said received signal for tracking said received signal,
   means for combining said injected reference signal and said received signals,
   means for controlling said phase locked loop by detecting the frequency difference between said received signal and said injected reference signal, said injected reference signal containing the unknown doppler phase information, and
   means for comparing the phase of said injected reference signal with said transmitted signal for obtaining doppler phase shift.

7. A cooperative tracking system comprising
   means for radiating a continuous wave (C.W.) signal from a moving vehicle,
   at least three cooperative transponders located at fixed remote positions for receiving said C.W. signal,
   each of said transponders transmitting a C.W. signal to said vehicle that is phase coherent with said received signal,
   means in said vehicle for receiving each of said received transponder signals,
   variable frequency generating means in said vehicle for generating an injected reference signal of substantially high constant amplitude and displaced in frequency from said received signal,
   means for phase locking said variable frequency generating means with one of said received transponder signals, and means for comparing the phase of said injected reference signal with said transmitted signal for obtaining doppler phase shift.

8. A cooperating tracking system comprising means for radiating a continuous wave (C.W.) signal from a moving vehicle, at least three cooperative transponders located at fixed remote positions for receiving said C.W. signal, each of said transponders transmitting a C.W. signal to said vehicle that is phase coherent with said received signal, means in said vehicle for receiving each of said received transponder signals, variable frequency means in said vehicle for generating an injection reference signal of substantially high constant amplitude and displaced in frequency from said received signal, means for combining said injected reference signal and said received signals, means for phase locking said variable frequency means by detecting the frequency difference between said received signal and said injected reference signal, said injected reference signal containing unknown doppler phase information, and means for comparing the phase of said injected reference signal with said transmitted signal for obtaining doppler phase shift.

9. A system according to claim 8 in which said received signals are heterodyned by a local oscillator signal to a lower intermediate frequency and in which said variable frequency means is the source of said local oscillator signal.

10. A cooperative tracking system comprising means for radiating a continuous wave (C.W.) signal from a moving vehicle, at least three cooperative transponders located at fixed remote positions for receiving said C.W. signal, each of said transponders transmitting a C.W. signal to said vehicle that is phase coherent with said received signal, means in said vehicle for receiving each of said received transponder signals, means for adding said received signals with an injected reference signal before all phase varying stages, said injected reference signal differing from said received signals by an audio offset frequency, means for amplifying said received signals and said injected reference signal, means for detecting said audio offset frequency from the composite signal comprising said carrier signal and said injected reference signal, phase comprising means responsive to said audio offset frequency and a reference signal from an oscillator having a frequency equal to said audio offset frequency for generating a substantially D.C. signal, voltage controlled oscillator means being controlled by said D.C. signal for generating said injected reference signal at a frequency differing from said carrier signal by said audio offset frequency and containing the same phase information as said frequency varying input signal, and means for comparing the phase of said injected reference signal with said transmitted signal for obtaining a doppler phase shift indicative of range and range rate information.

11. A cooperative tracking system comprising means for radiating a continuous wave (C.W.) carrier signal from a moving vehicle, means for modulating said C.W. signal, at least three cooperative transponders located at fixed remote positions for receiving said C.W. signal, each of said transponders transmitting a C.W. signal to said vehicle that is phase coherent with said received signal, means in said vehicle for receiving each of said received transponder signals, means for comparing the phase of one of said received carrier signals with said transmitted signal thereby extracting the range rate doppler phase shift in said received signal, means for comparing the subcarrier phase shift of said same received carrier signal with said transmitted subcarrier signal thereby extracting the range doppler phase shift, and means for determining the carrier and subcarrier doppler difference phase shift in said other received signals relative to said detected doppler phase shift whereby the doppler phase shift in all of said received signal is determinable.

12. A cooperative tracking system comprising means for radiating a continuous wave (C.W.) signal from a moving vehicle, at least three cooperative transponders located at fixed remote positions for receiving said C.W. signal, each of said transponders transmitting a C.W. signal to said vehicle that is phase coherent with said received signal, means in said vehicle for receiving each of said received transponder signals, means for adding said received signals with an injected reference signal before all phase varying stages, said injected reference signal differing from said received signals by an audio offset frequency, means for amplifying said received signals and said injected reference signal, means for detecting said audio offset frequency from the composite signal comprising said received carrier signal and said injected reference signal, phase comparing means responsive to said audio offset frequency and a reference signal from an oscillator having a frequency equal to said audio offset frequency for generating a substantially D.C. signal, voltage controlled oscillator means being controlled by said D.C. signal for generating said injected reference signal at a frequency differing from said carrier signal by said audio offset frequency and containing the same phase information as said frequency varying input signal, means for comparing the subcarrier phase shift of said same received carrier signal with said transmitted subcarrier signal thereby extracting the range doppler phase shift, and means for comparing the phase of said injected reference signal with said transmitted signal for obtaining a doppler phase shift indicative of range and range rate information.

No references cited.

CHESTER L. JUSTUS, *Primary Examiner.*

R. D. BENNETT, *Assistant Examiner.*